Dec. 21, 1965  J. J. SCHULZE  3,224,327
APPARATUS FOR PRODUCING UNIFORM EXPOSURE ACROSS
THE WIDTH OF LIGHT SENSITIVE SHEETS
Filed Sept. 11, 1963  3 Sheets-Sheet 1
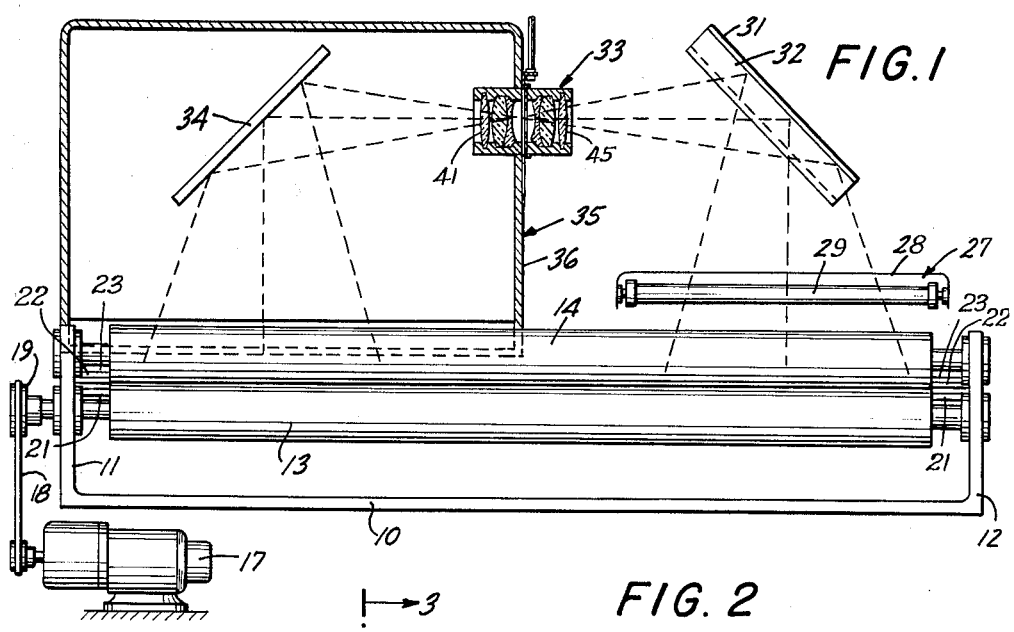
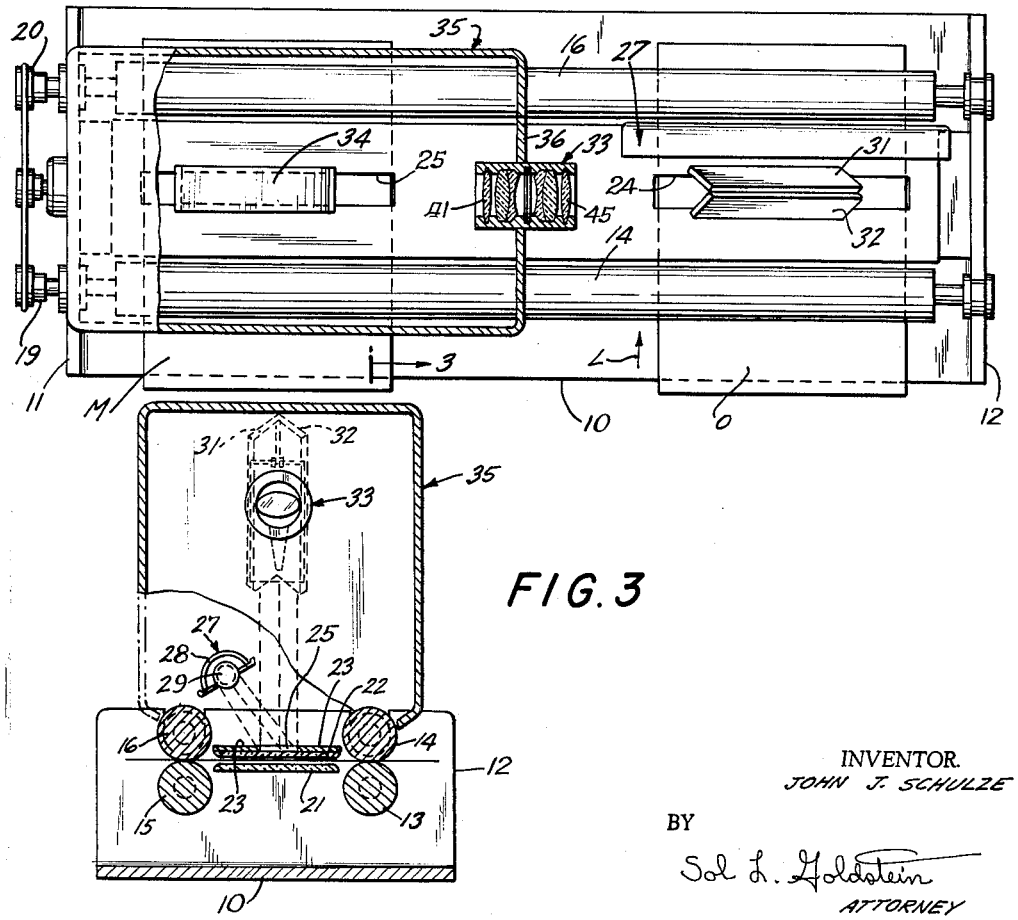
INVENTOR.
JOHN J. SCHULZE
BY
Sol L. Goldstein
ATTORNEY INVENTOR.
JOHN J. SCHULZE
BY
Sol L. Goldstein
ATTORNEY

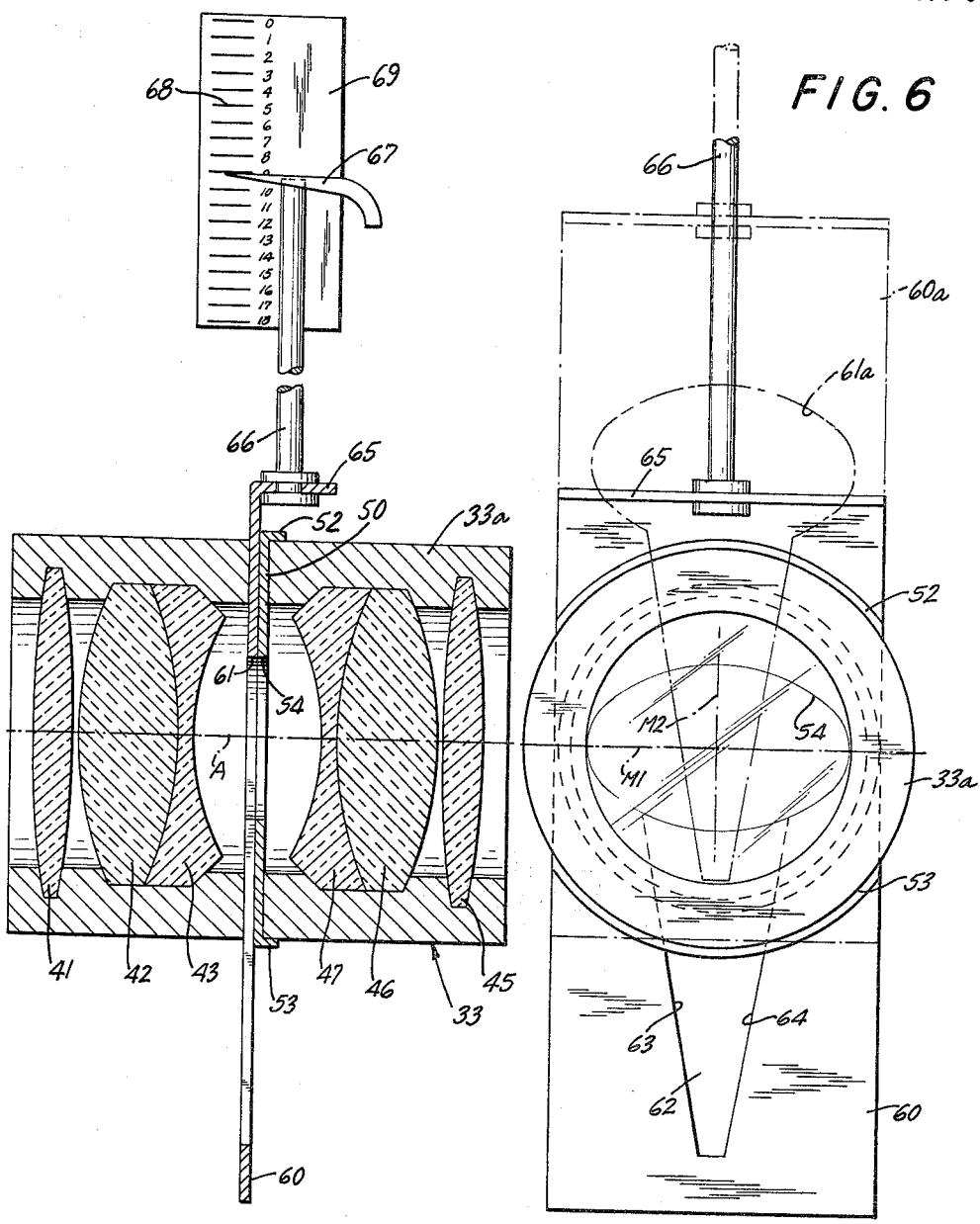

United States Patent Office 3,224,327
Patented Dec. 21, 1965

3,224,327
APPARATUS FOR PRODUCING UNIFORM EXPOSURE ACROSS THE WIDTH OF LIGHT SENSITIVE SHEETS
John J. Schulze, Prospect Heights, Ill., assignor to Addressograph-Multigraph Corporation, a corporation of Delaware
Filed Sept. 11, 1963, Ser. No. 308,123
8 Claims. (Cl. 88—24)

This invention relates to apparatus for exposing light-sensitive materials for forming latent images thereon of graphic originals to be copied by a scanning technique, and more particularly, to such apparatus having an improved lens diaphragm and shutter arrangement for providing uniform exposure from edge to edge of the final copy.

The present invention is an improvement in apparatus of the type disclosed in U.S. Patent No. 3,052,155 issued September 4, 1962 and entitled, "Apparatus for Exposing Light Sensitive Sheets and/or Webs." The apparatus of this patent involves the illumination of the original to be copied as it moves past a narrow aperture or window which scans successive narrow transverse increments of the original and projects the image onto a light sensitive sheet which is moving past a like aperture in timed relation and at the same speed as said original. The final developed image that is formed in an exact reproduction of the graphic original. The production of such an exact image which when developed produces good copies of uniform density from one edge of the sheet to the other requires the uniform exposure of the light-sensitive sheet from one edge thereof to the other corresponding to the length of the narrow transverse increment of the original that is scanned. The length of the increment of the sheet scanned in this specification will define the dimension of the sheet taken in a direction at right angles to its line of travel through the exposure apparatus, that is, the light-proof box, in which said image is projected onto the light-sensitive sheet. It is to be understood that reference to the light-sensitive material as a sheet includes webs as well as sheets of any desired length.

The problem of obtaining uniform exposure of light-sensitive sheets such as letters and documents having a width of about 8" to 11" and wider is complicated by the desideratum of making the light-proof box and the apparatus as a whole as small and compact as possible in order to reduce the manufacturing cost and space occupied by the apparatus. The requirement of compactness can be achieved by using a lens of relatively short focal length, but such lenses inherently project an image having substantially less intensity at the ends of the length of the increment being scanned than at the center so as to defeat uniformity of exposure. Such lenses can produce large variations between the amount of light at the central portion of the projected image and that which is available at the edges of the sheet.

To correct this defect of short focal length lenses it has heretofore been necessary to employ special lamp arrangements or particularly shaped illumination openings to provide illumination having a non-symmetrical shape to compensate for the effect of the lens. These prior corrective arrangements for providing uniform exposure were unduly complicated and disadvantageous in other respects.

In exposure apparatus of the type in which the present invention overcomes the problems and difficulties heretofore encountered in obtaining uniformity of exposure across the entire length of the area of scan, even when processing relatively wide sheets, the original is fed synchronously with an electrostatically charged photoconductive insulating sheet, each moving past an aperture which is a scanning aperture in the case of the original and an imaging aperture in the case of the charged sheet, having a length which is at least equal to the width of the sheet being copied. An optical system projects a beam of light onto the original as it passes under the scanning aperture and this beam of light is reflected therefrom, forming a narrow transverse increment image constituted of one or more lines of the moving original, which increment images are projected onto a first reflecting surface. Successive increment images corresponding to the contiguous portions of the original are reflected from the first reflecting surface through a lens which focuses the images onto a second reflecting surface, which in turn projects them onto a sheet of light-sensitive material moving past the imaging aperture and at the same linear speed as the original. The light images thus projected irradiates the electrostatically charged surface on the photoconductive material dissipating the charge in the light-struck areas and leaving charged those portions which are unexposed to light, thus producing electrostatic latent images which can be developed in the conventional manner by applying developer powder thereto and fixing the powder, as disclosed for example in said Patent 3,052,155.

It is well known that with all lenses the central portion of the light-sensitive material is better illuminated than the margins. This is usually due to the fact that some of the light rays which are transmitted from the ends of the narrow transverse area of scan of the original are incident to the first lens element at an angle to the axis of the latter so that these rays emerge from the lens element at an angle which does not pass through succeeding lens elements of the lens system. In other words, the tracing of the path of certain of the light rays transmitted from the edge portion of the line of scan will be found to be incident to the first lens element at an angle which will cause these rays to pass through the element and emerge therefrom along a trace that takes it outside the optical field of the system. This has the net effect of restricting the useful area of the lens system and hence the intensity of the light transmitted through the marginal portions of the lens system reflected from the edges of the transverse increment the original is less than that transmitted through the lens for the central portion of the increment. Another fact responsible for non-uniform light intensity across the length of the transverse increment projected onto the light-sensitive material is that the light rays coming from the edges of the original are cut off by the projecting rims of the lens barrel and the limited sizes of the lens so that in effect less light is transmitted to the marginal image areas of the light-sensitive sheet than to the intermediate or central portions. Stated otherwise the light image formed by the axial light rays transmitted through the central portions of the lens are not affected by the projecting rims of the lens barrel whereas the rays from the marginal or end areas of the transverse increment of the original are in part cut off and thus reduced in intensity. Due to these factors, the image projected by the lens onto the light-sensitive sheet will have substantially less illumination at the edge areas of the image than at its center. The exposure will therefore be non-uniform across the width of the light-sensitive sheet receiving noticably more illumination at the central portions than at the edges unless some corrective measure is taken.

This falling-off of illumination increases with the angle of view and becomes too severe for copying processes when the lens functions with a relatively wide viewing angle; that is, for a wide sheet. This would be the case when the lens is of relatively short focal length as required for a compact exposure apparatus. Generally a lens is regarded as "normal" when its focal length is approximately equal to the diagonal of the rectangular image formed in the optical plane, and a lens having a focal length significantly less than this is regarded as a "wide angle" lens.

Non-uniformity of exposure is, of course, objectionable because it results in non-uniform copies; while small differences in light intensity at the marginal and intermediate areas can be tolerated, differences which result in marked visible contrast on the developed copies renders the exposure apparatus commercially unsatisfactory. With currently available photoconductive material and for copying purposes, the use of a lens having a focal length less than the width of the portion of the original to be copied, the originals having a minimum width of about 8" results in a variation of from 2–5 times greater illumination at the edges than at the center which invariably results in poor copies when developed.

The shorter the focal length of the lens the smaller will be the conjugate distance between the original and the light-sensitive sheet, and also the shorter the distance between the lens and the light-sensitive sheet which latter distance controls the length of the light-proof exposure box. Hence the use of "wide angle" lens systems of relatively short focal length enables the apparatus as a whole to be smaller, more compact and less expensive in approximately direct proportion to the reduction in focal length of the lens. Therefore it is important that the lens focal length be as short as practical provided the falling-off in edge illumination or non-uniformity of light intensity is avoided.

It is a primary object of the present invention to provide a compact, less expensive exposing apparatus for projecting line images of high fidelity and uniformity onto light-sensitive materials while employing wide angle lens systems.

It is a further object of the present invention to provide a compact exposing apparatus having an optical system employing a wide angle lens including simple and effective control means for projecting uniform images onto light-sensitive sheets produced by taking a scan of an object in narrow transverse increments.

It is a specific object of the present invention to provide compact exposure apparatus employing a lens having a relatively short focal length and said apparatus being adapted to scan a narrow transverse extent of a moving original and to project an increment image onto a moving light-sensitive sheet including a shutter means for adjustably varying the exposure. In accordance with the present invention the lens system is provided with a diaphragm having an opening that is generally ovular in configuration, with the longest or major axis of the opening extending parallel to the longitudinal direction of the sheet movement and the shorter or minor axis extending normal to the plane of the sheet surface. The axial light rays transmitted from the central portion of the narrow transverse increment of the original which is scanned by the scanning aperture pass through the restricted portion of the diaphragm thereby decreasing the illumination transmitted from this zone; and the light rays from the edge portion of increment of the original which pass through the lens system are unaffected by the diaphragm. The sensitized sheet is therefore uniformly illuminated by a light image of the narrow transverse increment of the original through the short focal length lens. Significantly this is accomplished without reducing the illumination at the edge portions or the areas adjacent thereto and utilizing to best advantage the illumination available from the radiant energy source. The diaphragm restricts the light path through the short focal length lens system in direct relation to the amount of illumination which is lost by the use of the short focal length lens elements. The greatest restriction of the lens occurs along the axis normal to the longitudinal path of the sheet and gradually opens to accommodate the full lens diameter along the axis that extends parallel to the longitudinal movement of the sheet. An over-all improvement in the quality of reproduction is observed notwithstanding the fact that there is some reduction of illumination at the central portions of the sheet.

A movable lens stop for adjustably varying the exposure in accordance with the requirements of speed and sensitivity of the light-sensitive sheet is mounted for movement in a direction perpendicular to the lens axis from a position giving maximum exposure to a position giving minimum exposure. The movable lens stop is provided with an ovular opening that conforms to the configuration of the diaphragm opening which aligns coaxially with the lens when the movable lens stop is in said maximum exposure position, and with a tapered, slit-type opening for progressively closing off areas of the lens as the movable lens stop is moved from the maximum exposure position to the minimum exposure position. To advantage the shutter decreases the amount of illumination passing through the diaphragm opening without interfering with the uniformity of the projected light image from the edge to the center of the narrow transverse increment.

Other objects and advantages of the present invention are either inherent in the structure disclosed or will become apparent to those skilled in the art as the detailed description proceeds in connection with the accompanying drawings wherein:

FIGURE 1 is a front elevation view of an apparatus embodying the present invention, with parts thereof shown in section for clarity in illustration;

FIGURE 2 is a top plan view of the apparatus, shown partially in section;

FIGURE 3 is a longitudinal vertical sectional view taken on line 3—3 in FIGURE 2;

FIGURE 5 is a vertical longitudinal sectional view of the lens through the axis thereof; and FIGURE 6 is a front elevational view of the lens with the minimum exposure position of the movable lens stop indicated in dash-dot lines.

Figure 4:
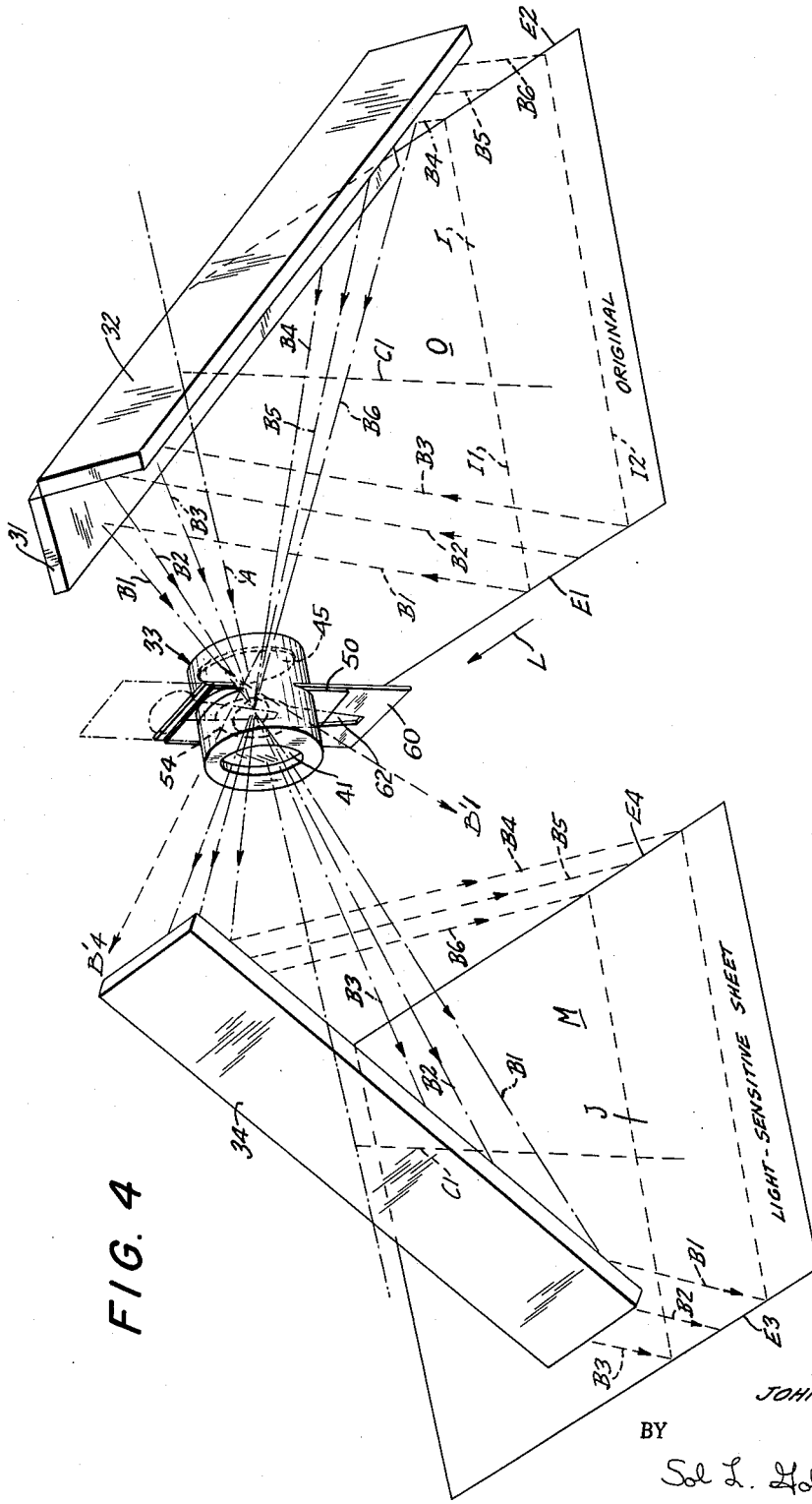
FIGURE 4 is a schematic perspective view of the optical system of the present invention, including the lens and reflecting mirrors.

In the preferred embodiment of the invention shown in the drawings, the reference numeral 10 indicates a U-shaped frame. A pair of side walls 11 and 12 have rotatably mounted thereon a first pair of feed rollers 13 and 14. Suitably spaced from this pair of feed rollers is a second pair of feed rollers 15 and 16 also rotatably mounted in side walls 11 and 12.

A motor 17 drives a chain 18 which passes over sprockets 19 and 20 keyed to the shafts of feed rollers 13 and 15 thus driving the latter. The peripheries of the upper rollers 14 and 16 are in frictional contact with the peripheries of the lower rollers 13 and 15 respectively and are thus driven thereby. The pairs of rollers 13, 14 and 15, 16 feed the original O and the photoconductive sheet material M in side-by-side parallel relationship through the same horizontal plane as shown in FIGURE 2. The original O and, if desired, the photoconductive sheet M can vary in width, the machine desirably has adjustable guides to permit the feed of both original and light-sensitive material of different widths, at least some of which have width of at least 8". For business copying purposes the machine can be designed to handle originals having a maximum width of about 11".

Transparent guide plates 21 and 22 of glass or plastic are suitably mounted in frame 10 between and coextensive with the two parts of spaced feed rollers 13, 14 and 15, 16 as best shown in FIGURE 3. These guide plates 21, 22 are spaced apart from each other sufficiently to permit the original O and the light-sensitive sheet M to pass therebetween but are sufficiently close to each other to prevent the original O and the sheet M from buckling. Atop guide plate 22 is an opaque exposure plate 23 having a pair of transversely extending rectangular windows or apertures 24 and 25 for scanning the original and imaging the light-sensitive sheet respectively as they pass underneath. The original O is illuminated through its aperture 24 extending transverse to the longitudinal direction of the original, and the resulting light image passes through the imaging aperture 25 onto the light-sensitive material M.

Feed rollers 13, 14 and 15, 16 extend substantially the full width of the machine. The original O which may be translucent or opaque in sheet or web form is fed through the machine in a horizontal plane by the right-hand end portion of these feed rollers, viewing FIGURES 1 and 2. The photoconductive material M which is of a width and length at least equal to the portion of the original to be copied, is fed through the machine by the left-hand end portion of these feed rollers. Thus both the original and the photoconductive insulating material are fed at the same rate.

A lamp 27 comprising a reflecting surface 28 and a lamp bulb 29 is positoned above the transparent guide plate 22. Lamp 27 may be any suitable type light source in the region of the spectrum between 3,650 A. and 6,000 A. wave length. Lamp 27 is positioned to project a narrow beam of light through the aperture 24 and the transparent guide plate 22 onto the original in a narrow transversely extending area thereof as shown in FIGURE 3. Lamp 27 is employed at all times when the machine is in operation to project the light beam onto the original, that is, it is employed both in the handling of opaque as well as translucent originals. It will be noted from FIGURE 2 that lamp 27 is so dimensioned that it projects a beam of light which extends across the full width of the original corresponding to the full length of the line of scan of said aperture. It will be recognized by one skilled in the art that the illuminating function may, if desired, comprise more than one lamp disposed above the transparent plate 22 or may be combined with an illuminating source (not shown) disposed beneath the transparent plate 21 in the circumstance where a translucent original is employed.

A pair of mirrors 31, 32 are suitably mounted on the apparatus with the upper edges of these mirrors in abutment and lying in intersecting planes at right angles to each other. The mirrors are of the same length and width sufficient to reflect a light image corresponding to the narrow transverse increment of the original illuminated and which is to be reproduced.

There is provided a light-proof box 35 having a wall 36 in which is mounted a lens 33 which may be of any suitable type capable of focusing the light image reflected from mirrors 31, 32 onto the reflecting surface 34. Lens 33 is preferably of the type disclosed in Patent No. 2,986,972 issued June 6, 1961 and is illustrated as comprising a first double convex lens element 41 (FIGURE 5) mounted in one end of a lens barrel shown schematically at 33a, a second double convex lens element 42 adjacent to element 41, and a double concave third lens element 43 cemented to element 42. Lens 33 is symmetrical and comprises at the opposite end of barrel 33a double convex lens elements 45, 46 which are similar to elements 41, 42 respectively, and a double concave lens element 47 similar to element 43. While the lens shown is preferred, it will be understood that the invention is not limited thereto and would include other wide angle lenses.

Reflecting surface 34, preferably in the form of a mirror, is positioned directly above the photoconductive light-sensitive sheet M and in transverse alignment with the mirrors 31, 32 to receive the optical image focused thereon by the lens 33.

In operation the original O and the charged photo-conductive material M are fed through the machine at the same rate by feed rollers 13, 14 and 15, 16. The original may be translucent or opaque. Synchronous feed is insured because the same feed rollers feed both the original O and the photo-conductive insulating material M in timed relation past their respective scanning apertures. The rate of feed is such that a narrow transversely extending increment equal to the area of the scanning aperture 24 of the original O indicated at I in FIGURE 4 has projected thereon light from lamp 27. As the original moves past the scanning aperture 24 it is scanned and the light images of the original thus pass from the original onto the mirror 32.

These light images are reflected from mirror 32 to mirror 31 which in turn reflects them through lens 33 as indicated by the dotted lines on FIGURE 4. Lens 33 focuses the light images onto reflecting surface 34 which in turn reflects the light images onto the moving photoconductive sheet M as it passes beneath the imaging aperture 25. The light thus projected onto the photoconductive sheet M discharges the portions of the electrostatic charge thereon irradiated by the light rays, thereby producing electrostatic images. The remainder of the surface of the photoconductive material, or the unexposed areas, are left in the charged condition. The electrostatic images thus produced are rendered visible by applying toner or developer powder thereto forming powder images which are fixed in any conventional manner.

The manner in which lenses 33, in the absence of the novel diaphragm arrangement of the present invention, produces non-uniform exposure across the width of the light-sensitive sheet M may best be understood by referring to the optical diagram shown in FIGURE 4. The transversely extending increment or area I of the original O which is exposed by the aperture 24 lies between the transverse lines I1, I2 and the longitudinal edges E1, E2 of the original O.

The reference designations B1, B2, B3 indicate a trace of marginal light rays transmitted upwardly from adjacent left hand edge E1 of the area I and reference designations B4, B5, and B6 indicate the trace of marginal light rays transmitted upwardly from the right hand edge E2. The designation C1 indicates a light ray trace transmitted upwardly from a central portion of original O.

It will be seen in FIGURE 4 that the marginal ray traces B1, B2, and B3 strike mirrors 31, 32 and are reflected by the latter through lens 33 at an angle to the lens axis indicated at A. Similarly, marginal rays B4, B5, and B6 are reflected by mirrors 31, 32 through lens 33 at an angle to lens axis A. On the other hand, light ray C1 from the central portion of original O is reflected by mirrors 31, 32 through lens 33 substantially along the axis A of the latter.

The ray traces B1, B2, and B3 which represent edge bundles of light are incident to the lens element 45 at a very large angle with the axis A so that a portion of the incident rays B1 and B4 will emerge from the other side of the lens element 45 along paths B'1 and B'4 remove these rays from the field of the next lens element 46. Still other ray traces approaching the lens from a sharp angle are blocked by the rim of the lens barrel. A portion of the edge rays therefore are unavailable to illuminate the sensitized surface. The central light rays C1, on the other hand, pass through the central portion of the lens and lens barrel without any appreciable loss in intensity. The net result is the projection onto sheet M of an image J having an appreciable lower level of illumination adjacent the longitudinal edges E3 and E4 than in the central portion thereof, and the wider the image and the light-sensitive sheet for any given lens the greater will be the variation from the edge to the center across the length of the line of scan which corresponds to the width of said sheet.

In accordance with the present invention, an iris diaphragm 50 in the form of a flat plate extending vertically through a slot formed in lens barrel 33a is located midway between the two double concave lens elements 43, and 47. Diaphragm 50 may be retained in assembled position by integral flanges 52, 53 or by some other suitable fastening means.

Diaphragm 50 has a generally ovular shaped opening 54 having its center coincident with lens axis A. The longest distance across the opening or the major axis M1 of the ovular opening 54 extends horizontally in the direction of the longitudinal movement of the sheet M and original O, as indicated by the arrow designated by the reference letter L in FIGURE 4, and the shortest distance of the opening or the minor axis M2 extends perpendicular to the longitudinal direction L.

It will thus be seen that the lens opening is restricted along axis M2 by an amount which is in direct relation to the amount of light transmitted from the edges of the original and are refracted outside the lens system upon striking the first lens element. It will be seen that the level of illumination across the increment of the original that is projected by the lens through the imaging aperture is adjusted to the maximum level of illumination that would be provided by the lens system from the illumination from the edges.

The edge rays which are incident to the lens element 45 across its surface and which emerge therefrom within the field of lens element 46 determines the limit of illumination to be provided at the central zone. Moving inward from the edge portions of the narrow transverse increment toward the center of the area 1 the amount of transmitted light that will pass through the lens increases, with the size of the opening decreasing proportionately to level out the illumination. Accordingly, all of the light from the edges that is transmitted by lens element 45 into the field of lens element 46 will pass through the diaphragm opening; however, some of the light from the central portion of area 1 will be blocked by the diaphragm although it is transmitted through the lens elements 45, 46, and 47. The effective lens aperture for the central light rays C1 is reduced leveling out the illumination across the length of the narrow transverse increment that it scanned corresponding to the width of the sheet M. The particular dimensions of the ovular opening will, of course, vary depending on the lens used, the maximum width of original and light sensitive sheet for which the machine is designed, etc.; for machines designed to handle very wide sheets, ovular openings having short minor axis are used, in general the wider the sheet (that is, the length of the narrow transverse increment of the original to be copied, the narrower the configuration of the oval). Optimum dimensions can readily be determined for any given situation by trying a few diaphragms having different size ovular openings. It has been found that for a lens having a 8" focal length, and processing sheets 11" wide, an opening the major axis of which is 1⅜" long and the minor axis ⅞" will give excellent results. The invention, of course, is not limited to these dimensions which are given for exemplification purposes.

In order to vary the exposure in accordance with the requirements imposed by originals having varying reflectivities and light-sensitive sheet material having different sensitivities, there is provided a shutter or a movable lens stop 60 in the form of a flat planar member located adjacent to diaphragm 50 and vertically reciprocally slidable within a slot formed in lens barrel 33a. Shutter 60 has an opening 61 which approximates the configuration of the diaphragm opening, the center of which is coaxial with lens 33 when movable lens stop 60 is in its lowermost position indicated in solid lines in FIGURE 6. The lowermost position provides the maximum exposure.

Movable lens stop 60 also has an opening 62 in communication at its upper end with opening 61 and having downwardly converging sides 63, 64 so as to be tapered or wedge-shaped. As movable lens stop 60 is moved upwardly from its lowermost maximum exposure position indicated in solid lines toward an uppermost minimum exposure position shown in dash-dot lines at 60a, opening 61 will gradually move out of alignment with lens axis A. Opening 62 of lens stop 60 is oriented with respect to the ovular opening 54 of diaphragm 50 so that the major axis M1 is changed via continuous control without changing the dimensions of the minor axis M2 for lens stop settings that admit greater amounts of light. The opening 54 will present an ovular configuration as long as the major axis M1 moves out of alignment as long as the major axis M1 is greater than the minor axis M2 thereby reducing the light from C1, compared to the amount of light from the edges E1 and E2 to even out the exposure. Tapered opening 62 will gradually move upward so as to mask progressively increasing areas of lens 33 during this upward movement of movable lens stop 60. As the lens stop moves toward the uppermost position for giving the minimum exposure the major axis M1 is less than the minor axis M2 and, therefore, the problem of uneven illumination is obviated since the effective lens opening has been reduced to an area that is much smaller in relation to the total area of the lens at maximum exposure. At this reduced opening, the lens admits as much light from the edges of the line of scan as from the center. The exposure may thus be selectively varied by moving movable lens stop 60 to any position between the two extremes indicated in FIGURE 6.

In order to provide an indication to the operator of the exposure corresponding to any particular position of movable lens stop 60, the upper end of movable lens stop 60 has an integral horizontally extending flange 65 to which is secured the lower end of rod 66 having at its upper end an exposure indicator 67 adapted to register with the indicia scale 68 on a plate 69 suitably mounted on the machine.

Tapered opening 62 of shutter 60 is oriented with respect to ovular opening 65 of diaphragm 50 so that the effective lens aperture may be varied to regulate the exposure without interfering with the function of diaphragm 50 since the tapered opening does not alter the dimension M2 of the opening 54.

It will be noted that the present invention provides an improved compact exposing apparatus wherein the light image projected onto the light-sensitive sheet is of substantially uniform intensity across the width of the sheet so as to provide uniform exposure notwithstanding that the compactness is achieved by use of a reltaively wide angle lens.

It is to be understood that the specific embodiment of the invention disclosed herein is merely illustrative of one of the many forms which the invention may take in practice without departing from the scope thereof as delineated in the appended claims. For example, while the apparatus shown in the drawings involves the feed of the original and light-sensitive sheet in a horizontal plane, the machine can be designed for feed in vertical or inclined planes or in an arc with the diaphragm having the elliptical opening oriented in the same relative position to give uniform light intensity across the width of the sheet; nor need the original and light-sensitive sheet be fed in side-by-side relation but they can be fed in any desired relative positions at the same speed with the optical system arranged to project light image increments of the original onto the light-sensitive sheet and the major axis of the elliptical opening extending in the generally longitudinal direction of movement of the light-sensitive sheet.

What is claimed is:

1. An exposing apparatus comprising means for feeding in timed relation sheet elements including an original to be copied and a light-sensitive material, exposure means including a scanning aperture for illuminating a narrow increment of said original and an imaging aperture for exposing said light-sensitive sheet, means to illuminate said original and a lens for projecting said increment light image transmitted from said original to said light-sensitive material as said elements pass the respective apertures and oval masking means oriented within said lens to restrict the passage of a portion of the light rays emanating from the central portion of said increment light image and transmitting those light rays emanating from the edge portions of said increment light image entering said lens whereby the light-sensitive sheet is uniformly exposed.

2. An exposing apparatus as defined in claim 1 wherein said lens comprises a movable lens stop, and means mounting the movable lens stop for movement from a maximum exposure position to a minimum exposure position, said movable lens stop having a tapered opening for closing off progressively increasing areas of the lens without further restriction of the light rays from the central portion of the image as the movable lens stop is moved from said maximum exposure position to said minimum exposure position.

3. An exposing apparatus comprising means for feeding in timed relation a pair of sheet elements including an original and a light-sensitive sheet, exposure means including a scanning aperture for illuminating a narrow increment of said original and an imaging aperture for exposing said light-sensitive sheet, said apertures extending transversely in the direction of movement of said sheet elements, means to illuminate said original to form a narrow transverse increment image of said original, a lens for projecting the image transmitted from said original to the light sensitive sheet and having a focal length less than the transverse dimension of said increment, and a diaphragm associated with the lens having a substantially ovular light-transmitting opening with its major axis extending parallel to the longitudinal direction of the movement of said sheet elements through said apparatus, whereby said light sensitive sheet is uniformly exposed.

4. An exposing apparatus as defined in claim 3 wherein said lens comprises a movable lens stop, and means mounting the movable lens stop for reciprocal sliding movement in a direction perpendicular to the axis of the lens from a maximum exposure position to a minimum exposure position, said movable lens stop having an opening for closing off progressively increasing areas of the lens without changing the dimension of the diaphragm along the minor axis as the movable lens stop is moved from said maximum position to said minimum exposure position.

5. In an apparatus for exposing light sensitive material including means for feeding a pair of sheet elements each having a width of about 11″ comprising an original and light-sensitive material, exposure means including a scanning aperture for illuminating a narrow transverse increment of said original and an imaging aperture for exposing said light sensitive sheet, means to illuminate said original, a first reflecting surface for reflecting the light image of the transverse increment of said original, a second reflecting surface for reflecting said image from said first reflecting surface to said light sensitive material as it passes said exposure means, and a lens for projecting light transmitted from said first reflecting surface to said second reflecting surface and having a focal length less than 11″, the improvement wherein said less comprises an iris diaphragm having a substantially ovular opening, the major axis of said opening extending parallel to the longitudinal direction of the movement of said sheets through the apparatus.

6. An exposing apparatus as defined in claim 5 wherein said lens comprises a movable lens stop, and means mounting the movable lens stop for movement in a direction perpendicular to the axis of the lens from a position giving maximum exposure to a position giving minimum exposure, said movable lens stop having a substantially ovular opening coaxial with the lens when the movable lens stop is in said maximum exposure position and having a tapered opening for closing off progressively increasing areas of the lens without changing the dimension of the diaphragm along the minor axis as the movable lens stop is moved from said maximum exposure position to said minimum exposure position.

7. An exposing apparatus comprising a light-proof box having an opening at one end thereof, a plurality of rollers for feeding in a pair of sheet elements including an original having a predetermined maximum width simultaneously in substantially parallel spaced side-by-side relation with a light-sensitive sheet, a first and second narrow scanning aperture lying in the feed path of said original and said light-sensitive sheet respectively and extending transversely across the entire widths thereof, a first mirror means for reflecting light from said first aperture, a second mirror means mounted within said light-proof box for reflecting light from said first mirror means through said box opening to said light-sensitive sheet as said sheet passes beneath said second aperture, said box having a wall between said first mirror means and said second mirror means and a lens mounted in said box wall for projecting light transmitted from said first mirror means to said second mirror means, said lens having a focal length less than said maximum width of the original, said lens including a diaphragm having a substantially ovular opening with its major axis extending in the direction of and parallel to the movement of said sheet elements through said apparatus, whereby said light sensitive sheet is uniformly exposed.

8. An exposing apparatus as defined in claim 7 wherein said lens comprises a movable lens stop, and means mounting the movable lens stop for movement in a plane perpendicular to the axis of the lens from a position giving maximum exposure to a position giving minimum exposure, said movable lens stop having an opening at least of the size of said diaphragm opening and coaxial with the lens when the movable lens stop is in said maximum exposure position and having a tapered opening for masking progressively increasing areas of the lens without changing the dimension of the diaphragm along the minor axis as the movable lens stop is moved from said maximum exposure position to said minimum exposure position.

References Cited by the Examiner

UNITED STATES PATENTS

| | | | |
|---|---|---|---|
| 2,930,284 | 3/1960 | Limberger | 88—24 |
| 3,052,155 | 9/1962 | Hurin et al. | 88—24 |
| 3,155,979 | 11/1964 | Mast et al. | 88—24 X |

NORTON ANSHER, *Primary Examiner.*

R. A. WINTERCORN, *Assistant Examiner.*